United States Patent [19]

Lee

[11] Patent Number: 5,040,710
[45] Date of Patent: Aug. 20, 1991

[54] UTILITY RACK

[76] Inventor: Andy J. Lee, 3463 State St., #379, Santa Barbara, Calif. 93105

[21] Appl. No.: 433,740

[22] Filed: Nov. 9, 1989

[51] Int. Cl.⁵ .............................................. F16B 2/06
[52] U.S. Cl. .................................... 224/39; 248/916;
 248/558; 403/3; 224/30 R; 224/31; 224/282;
 224/35; 224/36; 224/41; 224/42.45 R
[58] Field of Search ............... 224/282, 30 R, 30 A,
 224/31, 32, 33, 35, 36, 39, 41, 42.42, 42.45 R;
 403/3, 4; 248/916, 558

[56] References Cited

U.S. PATENT DOCUMENTS

| | | | |
|---|---|---|---|
| 1,460,760 | 7/1923 | McGee | 224/32.R X |
| 3,237,899 | 3/1966 | Lewis | 224/39 R X |
| 4,193,525 | 3/1980 | Sommers | 224/35 |
| 4,328,915 | 5/1982 | Melton | 224/32 R |
| 4,786,025 | 11/1988 | Shuman | 248/558 |
| 4,903,932 | 2/1990 | Stewart, Jr. | 248/558 X |

FOREIGN PATENT DOCUMENTS

| | | | |
|---|---|---|---|
| 1033327 | 7/1953 | France | 224/32 R |
| 87/05082 | 8/1987 | PCT Int'l Appl. | 224/36 |
| 526994 | 9/1940 | United Kingdom | 224/36 |

Primary Examiner—Ernest G. Cusick
Attorney, Agent, or Firm—Nathan Epstein

[57] ABSTRACT

A bicycle utility carrying rack has a two piece clamp and a separate carrying grid. One clamp piece is bent to form a square-ended head which fits in a channel in the grid. The grid can be assembled to the clamp in one of two mutually perpendicular orientations for flexibility in mounting at various points of a bicycle frame. A single bolt secures the grid to the clamp and once assembled, the grid cannot turn about the bolt to another position unless disassembled from the clamp.

13 Claims, 2 Drawing Sheets

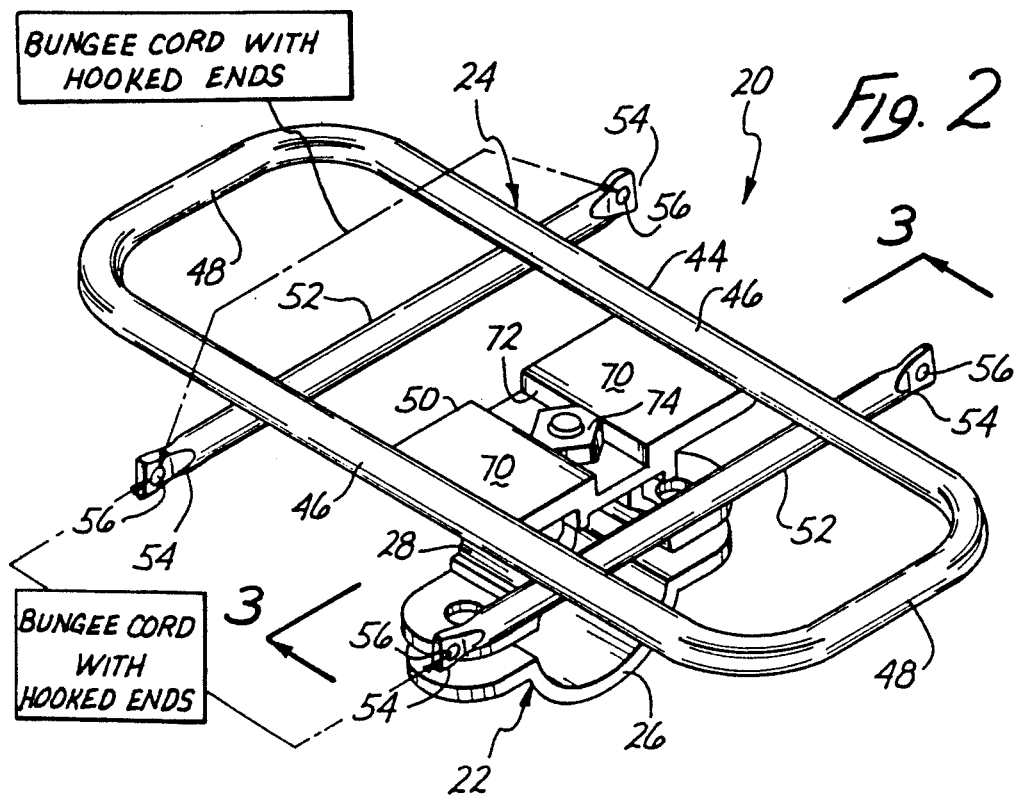
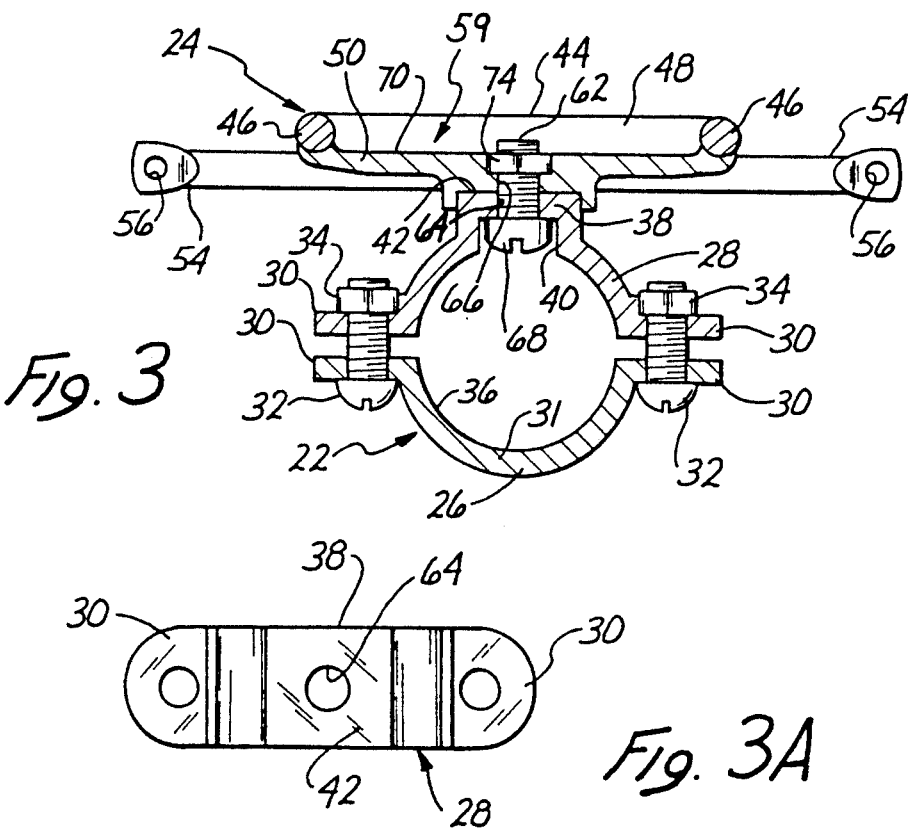

UTILITY RACK

BACKGROUND OF THE INVENTION

1. Field of the Invention

This invention relates to carrying racks of the type which are mounted to a vehicle for transporting cargo of sundry nature. In particular, this invention is an improved carrying rack for bicycles and such, characterized by its versatility and ease of mounting in a wide variety of orientations on a cycle frame.

2. Background of the Invention

Carrying racks for bicycles and small motorcycles and similar vehicles are well-known. Typically, such carrying racks consist of an open frame assemble from thin tubing or rod stock and generally include a planar grid fastened to the bicycle frame in a variety of ways. The most common practice has been to mount such carrying racks over the rear wheel of the cycle, behind and below the rider's seat. Packages are placed on the rack and usually secured by means of some type of tie. Frequently, such racks are equipped with spring loaded arms which serve to hold down articles placed under the arm on the rack. Conventional racks of this type tend to be of substantial size and weight.

While these carrying racks have long been in widespread use and are quite useful, their sizing and mounting hardware does not allow flexibility in positioning or options in their attachment at locations more convenient and accessible to the cyclist while in motion Because of these limitations, as practical matter only one such conventional rack can be fitted to a bicycle. While other baggage carrying accessories are available for bicycles, such as a basket mounted in front of the handlebars and over the front wheel, as well as various bags which can be suspended to on the cycle frame, these carrying devices are relatively bulky, sometimes unsightly, and whether or not in use detract from the streamlining of the bicycle. For these and other reasons these accessories are objectionable to many cycling enthusiasts.

Furthermore, available baggage carrying accessories are not well suited for carrying articles such as a "Walkman" (R) type radio, tape player or compact disc player, and many other relatively small items which for convenience are best temporarily fastened for the duration of a bicycle ride, yet should be easily accessible while the bicycle is being ridden.

Accessories now available do not satisfy the need for a small, lightweight, low profile, low maintenance, durable and inexpensive carrying rack which can be inobtrusively, quickly and conveniently attached to the bicycle frame at a variety of locations and positions, to provide a dependable and versatile mounting platform or attachment point for almost any reasonable item or package to be carried on a cycle.

SUMMARY OF THE INVENTION

The aforementioned need is addressed by the improved utility rack described below, which is particularly suited for, but not limited to, attachment to the frame of a cycle or other means of transport. This novel carrying rack has a clamp adapted for attachment to a tubular support, such as one of the several tubes comprising a cycle frame, and an open-work grid. The clamp and the grid are assembled to each other by means of interfitting portions which index the orientation of the grid relative to the clamp and positively limit the grid to one of two mutually perpendicular orientations relatively to the clamp axis. Once assembled in the selected orientation, the clamp and grid are fastened together in an interference fit by means of a single bolt and a nut threaded on the bolt.

The grid is generally planar and the single bolt passes through aligned holes in each of the clamp and the rack with its axis perpendicular to the plane of the rack. The bolt is also radial to the tubular support which is encompass by the mounting clamp. The interfitting portions mate closely so as to positively secure the rack and the clamp against relative rotation about the single bolt.

The mounting clamp in the preferred embodiment of the invention includes two arcuate clamp elements joined at their ends by means of screws to form a closed approximately circular unit which can be tightened about a tubular support, such as a tube of a bicycle frame. One clamp element has a radially projecting rectangular head which fits into a channel in the underside of the grid unit. A bolt hole is formed in the head and in the channel. These holes are aligned when the clamp and the grid are assembled and a threaded bolt fits through the aligned holes. The clamp head is square ended and the width of the receiving channel on the grid is slightly greater than the side dimension of this square end. Mating of the grid to the clamp is possible only with proper alignment of the head and channel, which alignment occurs at 90 degrees rotational intervals between the grid and the clamp about the fastener bolt. Accurate indexing and positive locking of the grid and clamp are ensured once the two elements are fastened together by tightening the nut on the bolt.

The open work grid of the presently preferred embodiment has a generally rectangular round cornered elongated frame made, for example, of cylindrical rod stock, a mounting bar affixed to the underside of the frame and two rod segments likewise affixed to the underside of the rectangular frame, one on either side of the mounting bar. The two rods have rod ends which extend on either side of the rectangular frame and provide convenient tie points for securing a load to the grid. Preferably, the rod ends have holes into which can be set the end hooks of elastic bungee-cords commonly used for this purpose.

This grid therefore generally defines a shallow tray the walls of which are defined by the thickness of the rectangular frame and the bottom by the mounting bar and rod segments. The grid consequently defines a shallow rectangular recess into which can be nestled packages or articles to be carried. In particular, this recess is sized and dimensioned such as to snugly receive a plastic bottle or beverage container of the type commonly carried by cyclists for replenishing fluid lost during strenuous exercise. Such a bottle is laid sideways into this frame and when secured with a Bungee-cord or the like will be held securely in place on this grid. Beverage bottles are presently carried by cyclists on special-purpose cages mounted to the bicycle frame. The cages however are not readily useful for carrying any other item except such a bottle. The utility rack of this invention is however of a more versatile nature and when not used for carrying a bottle, is equally useful for carrying a portable radio or tape player, or virtually any other reasonably sized and shaped item.

The ability to rotate the rack frame through 90 degrees about the bolt axis relative to the mounting clamp considerably enhances the versatility of this utility rack, in that the orientation of the rack can be selected to suit the nature of the load being carried, the convenience of the rider and the availability of mounting spaces on the bicycle frame. The rack of this invention, for example, in a mini-size version, is suitable for mounting on the handlebar of a cycle for carrying a radio or other music player in an immediately accessible and plainly visible location for e.g. tuning of stations or manually turning over an audio cassette tape. If desired the carrying rack can just as easily be mounted on the cross-bar (top tube) of the cycle frame, on the "down tube" of the frame, on the seat tube and even on the head tube which receives the front wheel fork. The axial orientation of the mounting clamp is dictated by the choice of mounting location on the bicycle frame; however the relative orientation of the grid can be chosen to suit the convenience of the rider. Further, since the clamp of the utility rack can be rotated about its axis on the supporting tube, the grid can be positioned over or under a particular tube of the bicycle frame, or to either side of the bicycle frame.

Because of this versatility in the mounting, and being lightweight, and in the possible uses of a mini-sized version of the utility rack here disclosed, several such racks may be installed on a given cycle frame for carrying various articles without thereby adding excessive bulk or weight to the cycle nor adding significantly to the wind resistance of the bicycle.

It will be understood that the uses and applications of this utility rack are by no means limited to cycle carrying racks For example and without limitation, the utility rack here disclosed can be advantageously employed for displays of merchandise in shops and in window displays by providing suitable tubular supports for mounting of the racks. Still many other applications will become apparent.

These and other advantages of the present invention will be better understood by reference to the following detailed description of the preferred embodiment and the attached drawings.

BRIEF DESCRIPTION OF THE DRAWINGS

FIG. 2 is a perspective view of the utility rack of this invention with the grid attached to the clamp in alignment with the clamp axis;

FIG. 3 is a section taken along line 3—3 in FIG. 2, the section being transverse to the clamp axis;

FIG. 3a is a top plan view of the upper clamp element showing the square end surface of the projecting head;

DETAILED DESCRIPTION OF THE PREFERRED EMBODIMENTS

Figure 1:
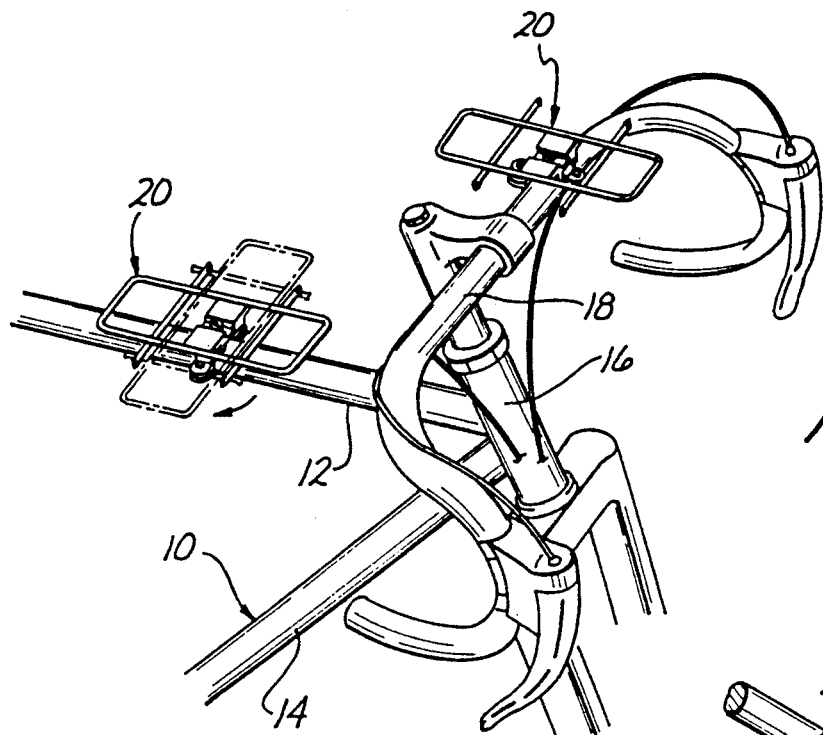
FIG. 1 is a fragmentary perspective view of a bicycle frame showing two utility racks according to this invention, one mounted to the handlebar, the other to the top tube (cross tube) of the frame, the latter also shown in phantom lining in alternate transverse orientation.

With reference to the drawings, FIG. 1 shows the upper forward portion of a typical bicycle frame 10, including portions of a top tube 12, a lower tube 14, a fork tube 16 and handlebar 18. All of these cycle frame elements are usually tubular, typically aluminum tubing approximately 1 to 1178 inches in diameter. The utility rack of this invention is generally designated by the numeral 20, and by way of example, two utility racks 20 are shown installed on the bicycle frame 10, one on the left-hand side of the handle bar 18 and the other on the top tube 12. Each utility rack 20 has an elongated dimension which in both cases is aligned with the cycle frame, i.e. with the direction of the top tube 12 (the rack 20 mounted to top tube 12 is also shown in dotted lining in an alternative, transverse orientation).

Turning now to FIG. 2, the utility rack 20 includes a mounting clamp generally designated by numeral 22 and an openwork grid generally designated by numeral 24. As best seen in FIG. 3, the clamp 22 includes two generally arcuate clamp elements: a lower clamp element 26 and an upper clamp element 28, each element having an arcuate intermediate section and opposite perforated end flanges 30 joined by means of screws 32 and nuts 34. As shown in FIG. 3, the two clamp elements together define a generally circular interior aperture 36.

The lower clamp element 26 has two end flanges 30 connected by an approximately semi-circular intermediate portion 31. The upper clamp element 28 differs from the lower clamp element 26 in that it has a rectangular clamp head 38 projecting radially and equidistant from the end flanges 30. The head 38 defines a flat square end face 42 as shown in FIG. 3a, and also a recess 40 in its underside.

The grid 24 includes a generally rectangular frame element 44 which has two longer sides 46 joined by two shorter sides 48. A mounting bar 50 and two transverse rod segments 52 are affixed transversely to the longer sides 46, as by welding, to the underside of the frame element 44 as best seen in FIG. 3. The mounting bar is centered along the sides 46 while the rod segments are about halfway between the bar 50 and the short sides 48. The two rod segments 52 are longer than the width of the frame so that rod ends 54 project outside the frame element 44.

As best seen in FIG. 3, the interior of the rectangular frame element 44 defines a shallow rectangular recess 59 bottomed by the transverse mounting bar 50 and transverse rod segments 52. This recess provides a nestling place or tray for items such as a beverage bottle of the type commonly carried by cyclists. Such a bottle can be laid on its side into the interior 59 of the grid 24 and secured by means such as elastic retaining straps, particularly those of the type commonly known as Bungee-cord elastic straps provided with a wire hook at each end. Holes 56 in the rod ends 54 are provided for receiving the hooks of such Bungee-cords so that an article to be transported on the rack can be quickly and easily secured in place by simply slipping the tie hooks into these holes.

Figure 4:
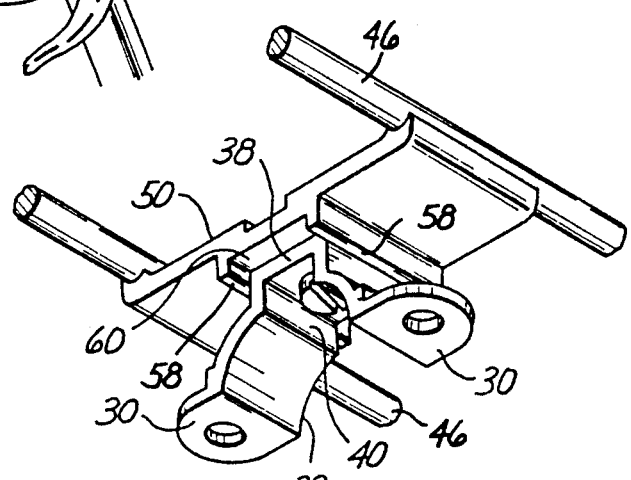
FIG. 4 illustrates the upper clamp element attached to the grid mounting bar aligned as in FIGS. 2 and 3.
Figure 5:
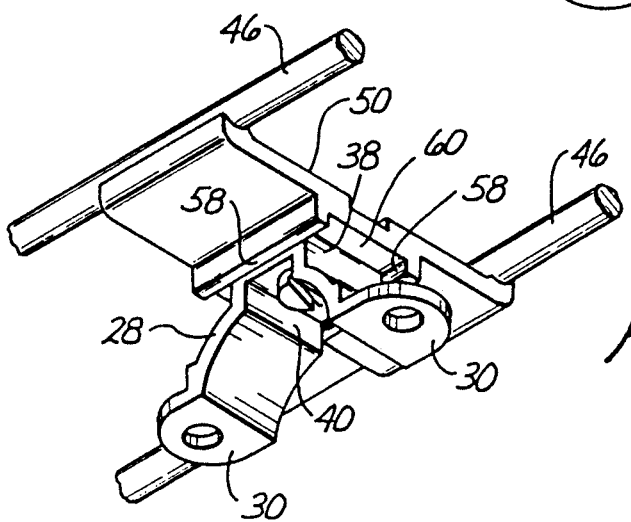
FIG. 5 is a view as in FIG. 4 showing the grid attached transversely to the clamp axis, i.e. rotated 90 degrees relative to FIG. 4.

Turn now to FIGS. 4 and 5 showing the underside of the mounting bar 50 with attached portions of the long sides 46 of the rectangular frame 44. Parallel flanges or ribs 58 are spaced to define a clamp head receiving channel 60 just slightly wider than the side dimension of the rectangular end face 42 of the clamp head 38. The channel 60 has a bolt hole 66.

A mounting bolt 62 passes through aligned holes 64 in the clamp head 38 and 66 in the mounting bar 50. The bolt head 68 is received within the recess 40 defined by the clamp head so that the bolt head is out of the way and does not interfere with mounting of the clamp to a tubular support.

The mounting bar 50 has a top surface 70 with a slot 72 cut, as best seen in FIGS. 2 and 3, transversely to the mounting bar 50. Slot 72 has a width and depth such that a retaining nut 74 can be threaded onto the end of the mounting bolt 62 protruding from hole 66 and the nut will be recessed into the slot 72 beneath the surface 70 so as not to interfere with placement of articles on the rack and in the recess 58. The width of the slot 72 is such that the retaining nut 74 is kept against rotation within the slot.

The clamp head 38 can be fitted into the channel 60 between the two ribs 58 in one of only two orientations which are shown respectively in FIGS. 4 and 5. The two permissible orientations of the upper clamp element 28 are mutually perpendicular i.e. rotated by 90 degrees in relation to the grid 24. In other words, in FIG. 4, the clamp element 28 and consequently the entire mounting clamp 22 has its axis (the axis of the cylindrical element embraced by the clamp when mounted to the bicycle frame) aligned with the longitudinal dimension (parallel to the long sides 46) of the carrying grid 24, while in FIG. 5 the axis of the clamp is perpendicular to the long sides 46 of the carrying grid 24 and parallel with the two rods 52. Because of the square geometry of the end face 42 of the clamp head 38 and its close fit within the channel 60, the grid 24 can be assembled to the clamp in only one of these two relative orientations and once so assembled, the clamp 22 is positively locked against rotation about the bolt 62 relative to the grid 24.

The carrying rack 20 is installed by first placing the nut 74 in the slot 72 of the grid 24, then passing the bolt 62 through the hole 64 in the upper clamp element 28, then inserting the bolt end through the hole 66 in the rack mounting bar 50 and threading the bolt into the nut 74. The head 38 of the clamp will have been mated within the channel 60 in the selected orientation of the clamp relative to the rectangular frame 14. The bolt 62 is then tightened until the nut 74 is firmly drawn against the mounting bar 50 and the grid 24 is secured to the upper clamp element 28 in an interference fit between the bolt head 68 and nut 74. The rack 20 may then mounted at any desired location on the bicycle frame 10 by closing the clamp 22 about a selected tubular element of the bicycle frame. It will be noted that the utility rack 20 is not limited to the upright orientations shown in FIG. 1 i.e. with the plane of the rectangular frame 44 in a horizontal position relative to the ground and above the supporting tube. The clamp 22, if loosened relative to its tubular support, may be rotated about the selected tubular support of the cycle frame and tightened at any point along such revolution. Since the articles to be carried will normally be secured to the grid 24 by means of elastic supports or other ties, the rack unit may be mounted oriented downwardly, i.e. below a supporting tube of the bicycle frame, so that the load being carried on the rack 20 can be oriented and positioned entirely at the convenience of the rider of the cycle.

While a preferred form of the present invention has been shown and illustrated for purposes of example and clarity, it will be understood that many variations, substitutions and modifications to this described embodiment will become readily apparent to those possessed of ordinary skill in the art without thereby departing from the scope of the present invention. Therefore, the present invention is not limited to the described embodiment but is defined only by the following claims.

What is claimed is:

1. A utility carrying rack suitable for attachment to the frame of a bicycle comprising:
   a clamp adapted for attachment to a tubular support;
   a carrying grid;
   said clamp comprising arcuate upper and lower clamp elements joined at their ends, said upper clamp element having a square-ended radial projection adapted to fit into a head receiving channel defined by said carrying grid such that said carrying grid may be assembled to said clamp in one of a plurality of discrete relative orientations and fixed against movement to another of said orientations while in assembled relationship; and
   a fastener for securing said carrying grid to said clamp in assembled relationship, said fastener being removable to enable separation of said projection from said channel for enabling subsequent reassembly of said clamp and said carrying grid in another of said relative orientations.

2. The rack of claim 1 wherein said fastener comprises a bolt and a nut engageable to said bolt for securing together said carrying grid and said clamp.

3. The rack of claim 2 wherein said clamp and said carrying grid are apertured with holes aligned in said assembled condition for receiving said bolt.

4. The rack of claim 1 wherein said projection defines a recess in said clamp for receiving a head on said fastener.

5. The rack of claim 1 wherein said carrying grid includes a mounting bar defining said head receiving channel.

6. A utility carrying rack for attachment to the frame of a bicycle comprising:
   a clamp adapted for mounting to a tubular support and having a square-ended head projection;
   a carrying grid having a mounting bar defining a channel dimensioned to receive said projection such that said carrying grid may be selectively assembled to said clamp in one of two mutually perpendicular orientations; and
   a single bolt removably inserted through aligned holes defined in said head projection and in said mounting bar, and a nut threaded to said bolt for securing said carrying grid to said clamp;
   said channel keeping said square ended head projection against rotation about said bolt for positively fixing said frame in a selected one of said orientations.

7. The rack of claim 6 wherein said bolt has a head and said head projection defines an interior recess in said clamp for receiving said bolt head.

8. The rack of claim 7 wherein said clamp comprises two arcuate elements releasably joined to each other for encompassing said tubular support, said head projection being defined by a bend of rectangular shape in one of said two arcuate elements characterized in that the width of said projection in a circumferential direction is substantially equal to the width of said one element in an axial direction to thus define a square end-face.

9. The rack of claim 6 wherein said carrying grid comprises a generally rectangular frame having a top side and an underside, said mounting bar being fixed to said underside so that a shallow tray recess is defined within said frame for nestling an item to be carried on said rack.

10. The rack of claim 9 wherein said rectangular frame is suitable for nestling of a beverage container.

11. The rack of claim 9 wherein said mounting bar has an upper surface and a slot in said upper surface for recessing said nut beneath said upper surface and for holding said nut against rotation within said slot.

12. The rack of claim 9 further comprising a plurality of rods fixed to said underside and terminating in rod ends projecting outside said rectangular frame, said rod ends perforated for engagement of bungee-cord hooks or the like for securing a load to said carrying grid for transport.

13. The rack of claim 6 wherein said carrying grid comprises a generally rectangular frame having a top side and an underside, said mounting bar having an upper surface fixed to said underside so that a shallow tray recess is defined within said frame for nestling an item to be carried on said rack, said upper surface being slotted for recessing said nut beneath said upper surface and for holding said nut against rotation within said slot; and a plurality of rods fixed to said underside terminating in rod ends projecting outside said rectangular frame, said rod ends perforated for engagement of bungee-cord hooks or the like for securing a load to said carrying grid for transport on said carrying grid.

* * * * *